No. 756,503. PATENTED APR. 5, 1904.
O. E. JOHNSTON.
HUB FOR VEHICLE WHEELS.
APPLICATION FILED FEB. 25, 1904.
NO MODEL.

Witnesses
J. H. Walmsley
F. W. Schaefer

Inventor
Oman E. Johnston,
By H. A. Toulmin.
Attorney

THE NORRIS PETERS CO., PHOTO-LITHO., WASHINGTON, D. C.

No. 756,503. Patented April 5, 1904.

UNITED STATES PATENT OFFICE.

OMAN E. JOHNSTON, OF BELLEVUE, OHIO.

HUB FOR VEHICLE-WHEELS.

SPECIFICATION forming part of Letters Patent No. 756,503, dated April 5, 1904.

Application filed February 25, 1904. Serial No. 195,151. (No model.)

*To all whom it may concern:*

Be it known that I, OMAN E. JOHNSTON, a citizen of the United States, residing at Bellevue, in the county of Huron and State of Ohio, have invented certain new and useful Improvements in Hubs for Vehicle-Wheels, of which the following is a specification, reference being had therein to the accompanying drawings.

This invention relates to improvements in hubs for vehicle-wheels, being especially designed for use in wheels employed in agricultural implements where flying dust and dirt tend to enter the journal to the detriment of the structure.

My present invention is an improvement upon my wheel or disk hub embraced in Letters Patent of the United States granted to me February 25, 1902, and numbered 693,867. In that hub it was required that an axle should be of such shape or size that it could be inserted into the skein or bushing from the outside inward.

In the present invention the object is to employ axles which by reason of their shape or size inward from the spindle cannot be inserted into the skein or bushing except from the point of the spindle; and a further object is with this type of axle to entirely inclose the fastening means by which the axle is kept from coming out of the skein or bushing.

The essential feature which enables these objects to be carried into effect is in the nature of a removable head or device carried by the spindle and capable of entering the hub from its inner open end (the outer end being closed) and also capable of preventing the spindle from pulling out of the skein or bushing.

Figure 1:
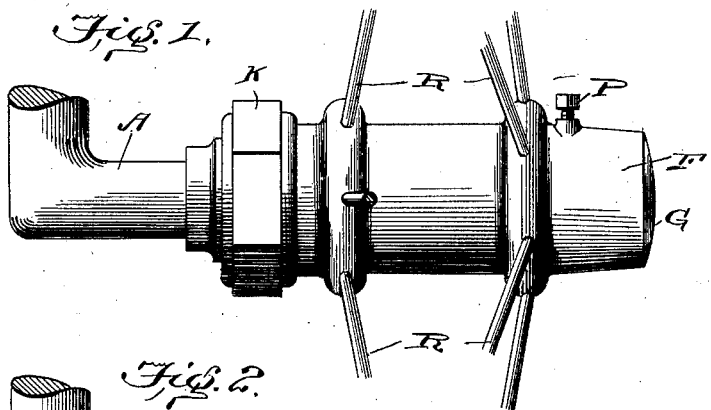
Figure 2:
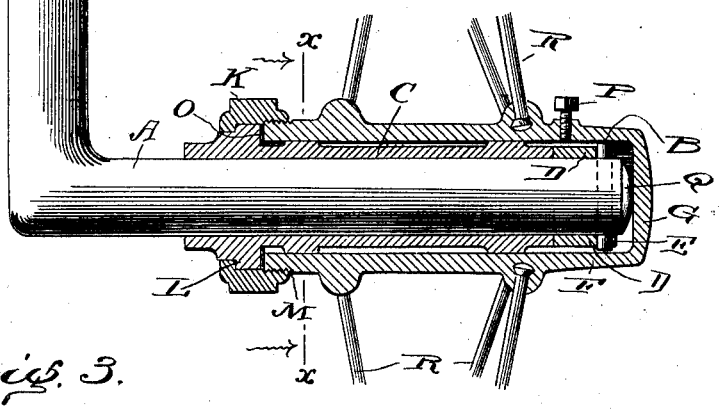
Figure 3:
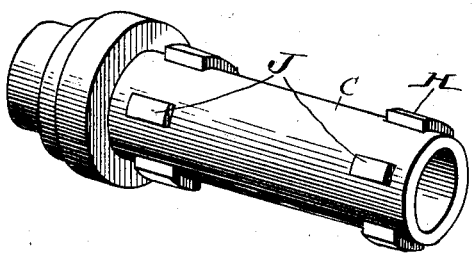
Figure 4:
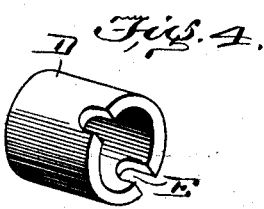
Figure 5:
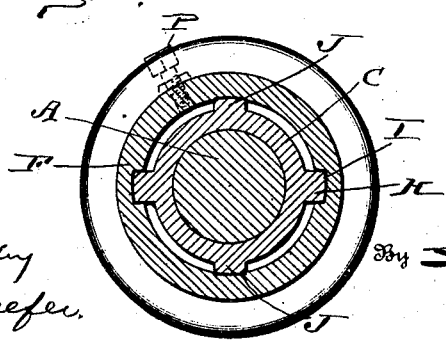

In the accompanying drawings, forming a part of this specification, and on which like reference-letters indicate corresponding parts, Figure 1 is a side elevation of the hub embodying my invention, an axle being shown in connection therewith; Fig. 2, a side elevation of a portion of the axle and a vertical longitudinal sectional view of the hub, the skein or bushing, and the several coöperating parts; Fig. 3, a detail perspective view of the skein or bushing removed; Fig. 4, a detail perspective view of a washer, and Fig. 5 a transverse sectional view on the line X X of Fig. 2 looking in the direction of the arrow.

The letter A designates a vehicle-axle—say the axle of an agricultural implement—of the type known as the "arched" or "bent" axle." It is obvious that with such an axle or with any other axle which is larger inward from the spindle portion than is the spindle portion itself the hub and skein must be applied to the spindle from the outer end of the latter. I provide such an axle with a linchpin B, which passes through a transverse opening in the spindle near the end thereof. This linchpin is removable and is in the nature of a removable head or shoulder carried by the spindle. Remove the linchpin, and then the spindle is insertible into the skein or bushing C, which forms a part of the hub structure. A washer D, suited for use in connection with the linchpin by having notches E, is also slipped on the spindle. Then the linchpin or removable device is applied to the spindle. Thus the skein cannot slip off the spindle and over its end.

The letter F designates the hub proper, which is closed at its outer end, as seen at G, but is open at its inner end. The skein C, with the spindle and washer D and the device or pin B, are now inserted into the hub through its open end. The skein has lugs H, which enter grooves I in the hub to interlock the two in the rotative direction. Other lugs J center the skein in the hub.

At K is indicated a coupling-nut fitted over the skein and adapted to bear against the shoulder L on the skein, so that the nut when screwed upon the threaded portion M of the hub will draw the hub and skein together, bringing the end of the hub against a suitable gasket O, which will exclude the ingress of dust and prevent the egress of the lubricant, which is introduced through the orifice closed by a screw P. It will now be seen that the spindle cannot withdraw inward from the skein because of the pin or removable device B. It will also be seen that the spindle cannot shift outwardly through the hub because of the closed end G. The spindle is rounded at its end, as shown at Q, to reduce the frictional contact between it and the closed hub end.

Thus it will be seen that the parts are easily assembled, that the spindle is duly and properly maintained in the hub and skein, and that while dust is excluded the lubricant is confined.

The exterior of the hub and the connection of the spokes therewith may be of any approved type of construction. I have shown the spokes R as having heads, around which the hub is cast. It will further be understood that while I have described and while I prefer the nut K and the thread portion of the hub as a means of uniting the hub and skein, still some other suitable form of connection at this point may be employed.

Having thus fully described my invention, what I claim as new, and desire to secure by Letters Patent, is—

1. In a hub structure proper, the combination with a hub closed at one end, a skein insertible in the hub from the other end, a spindle insertible in the skein, a removable device acting to keep the spindle from withdrawing from the skein, a means to unite the hub and skein after the skein with the spindle therein is inserted in the hub.

2. In a hub structure, the combination with a hub proper closed at the outer end and open at the inner, the skein insertible therein, means to interlock the skein and hub rotatively, the spindle insertible from its outer end and into the skein, a removable device carried by the spindle and adapted to prevent its withdrawal from the skein, said device being also insertible in the hub, and means which connect the hub and spindle together.

3. In a hub structure, the combination with a hub proper closed at one end, open and screw-threaded at the other, a skein insertible in the hub and having a nut adapted to engage with the threaded part of the hub, a spindle insertible from its end into the skein, and a removable pin carried by the spindle, insertible in the hub and adapted to prevent the spindle from withdrawing from the skein.

4. In a hub structure, the combination with a hub proper closed at one end, open and screw-threaded at the other, a skein insertible in the hub and rotatively interlocked therewith, a nut on the skein to engage with the hub, and a gasket between the skein and hub, a spindle insertible in this skein, a washer and a linchpin carried by the spindle, the pin acting to keep the spindle from withdrawing from the skein and the closed end of the hub to keep the spindle from thrusting through the hub.

In testimony whereof I affix my signature in presence of two witnesses.

OMAN E. JOHNSTON.

Witnesses:
   JESSE VICKERY,
   GRACE E. ROBERTSON.